United States Patent

[11] 3,607,042

| [72] | Inventors | Scott Gordon Arber<br>Chessington;<br>Oswald William John Young, Surbiton,<br>both of England |
|---|---|---|
| [21] | Appl. No. | 795,083 |
| [22] | Filed | Jan. 29, 1969 |
| [45] | Patented | Sept. 21, 1971 |
| [73] | Assignee | United States Borax & Chemical<br>Corporation<br>Los Angeles, Calif. |
| [32] | Priority | Feb. 22, 1968 |
| [33] | | Great Britain |
| [31] | | 8766/68 |

[54] PREPARATION OF BORON NITRIDE
14 Claims, No Drawings

[52] U.S. Cl............................................................ 23/191
[51] Int. Cl............................................................ C01b 21/06
[50] Field of Search............................................... 23/191

[56] References Cited
UNITED STATES PATENTS

| 2,974,013 | 3/1961 | Litz.................................. | 23/191 |
| 1,135,232 | 4/1915 | Weintraub....................... | 23/191 |

FOREIGN PATENTS

| 990,652 | 4/1965 | England........................ | 23/191 |

*Primary Examiner*—Oscar R. Vertiz
*Assistant Examiner*—Charles B. Rodman
*Attorney*—James R. Thornton

ABSTRACT: Boron nitride is produced by nitriding boric acid or boric oxide in the presence of a support phase which is a chemically reducible metal compound such as zinc borate or cadmium borate. The reaction mass is viscosity. heated to about glass C. to 3603 1,800° C. in a reducing atmosphere to convert the metal compound to the elemental metal which is evaporated off to leave substantially pure boron nitride.

PREPARATION OF BORON NITRIDE

This invention relates to the preparation of boron nitride. Boron nitride is generally made by reaction between boric oxide (or a similar oxidic compound of boron) and nitrogen or ammonia at a temperature of about 900° C. For this reaction it is necessary to support the boric oxide on a diluent or support phase. The most commonly used support phase is calcium phosphate although carbon has also been proposed as a support phase. A disadvantage of previous processes for nitriding boric oxide on a support phase is that at the end of the reaction the support has to be removed, such as by washing with hydrochloric acid.

According to the present invention there is provided a process for the preparation of boron nitride which comprises first reacting ammonia (or the dissociation products thereof) with a nitridible oxide of boron dispersed on a support phase at an initial temperature sufficient to convert the major part of the boron oxide to boron nitride, the support phase being a metal compound that can be reduced chemically, and then increasing the reaction temperature to an elevated temperature sufficient to reduce the metal compound to the elemental metal, to convert any unreacted boron oxide to boron nitride and to evaporate the elemental metal. Suitable nitridible oxides of boron are boric acid and boric oxide.

In this process, no support phase is initially present which cannot be reduced to a metal which in turn can be evaporated. In the course of the reaction, boron nitride is formed which itself acts as a support phase for the unreacted boron oxide. The metallic support phase can then be reduced either by the ammonia or by addition of a reducing agent such as carbon which is added to the mixture of boron nitride and unreacted material obtained after the heating at the initial temperature.

The chemically reducible metal compound used as support phase may itself be a borate, for example cadmium borate may be used. Zinc compounds are particularly valuable as a support phase and zinc oxide can be used for this purpose. The most preferred reducible compound is however zinc borate. Thus, the preferred reducible metal compounds are the metal borates such as, for example, the borates of zinc and cadmium.

When zinc borate is used as the support phase for boric oxide it has been found that the zinc content of the product is decreased when a reaction temperature of more than about 800° C. is employed, preferably at least about 900° C. Above this temperature the zinc borate becomes reduced by the reducing atmosphere of the decomposed ammonia to elemental zinc which is then volatilized. The amount of zinc removed from the reaction mixture and its rate of removal depends upon the temperature of reaction. As the zinc is reduced and evaporates, boric oxide is liberated, and reacts to form more boron nitride.

Thus when zinc borate or cadmium borate is used as the support phase the metallic part can be readily removed by evaporation and the borate part is converted to boron nitride thereby providing a greater quantity of product per batch than when a nonboron containing material is used as the support phase.

The boron oxide and the reducible metal compound are preferably mixed together and formed into aggregates before being nitrided.

The metal which is evaporated from the reaction mixture can be condensed and is readily reconverted to the borate for further use as a support phase.

In general it is preferred to intimately mix about 3–6 parts of boric acid and 2–5 parts of the chemically reducible metal compound, such as the borate thereof, into a stiff paste with a little water (in a boric acid:borate weight ratio of 3:1–3:4). The paste is formed into aggregates (approximately British Standard Sieve No. 4) which are then dried and partially dehydrated by heating to about 160° C. The dried aggregates are then heated with ammonia to above 400° C. The reaction temperature is allowed to rise to 900° C. during which time most of the boric oxide is converted to boron nitride. The reaction temperature is then slowly raised up to about 1,350° C. to complete the nitriding and to reduce and remove the metallic component of the support phase.

Another method of removing the metal (e.g. zinc) is by powdering the material obtained after nitriding with ammonia at 900° C. mixing it with a deficiency of carbon, such as lampblack, in an amount slightly less than that needed according to the reactions

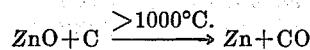

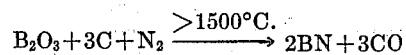

aggregating the mixture, drying the aggregates at about 300° C. and then reacting them with nitrogen at temperatures between 1,100°–1,800° C. in a furnace.

The following examples illustrate the invention further.

EXAMPLE 1

120 grams of boric acid were mixed with 72 grams of zinc borate ($ZnO \cdot B_2O_3 \cdot 2H_2O$). made into aggregates and dried. 153 grams of the dried aggregates were then reacted with ammonia to a maximum temperature of 800° C. Analysis of the product showed 28.8 percent N; 29.3 percent B; and 23.6 percent Zn. (Theoretical $BN$ =43.5 percent B, 56.5 percent N.).

EXAMPLE 2

420 grams of boric acid were mixed with 252 grams of zinc borate, aggregated, and dried. 453 grams of the dried aggregates were nitrided with ammonia to a maximum temperature of 1,200° C. to give about 220 grams of product analyzing 41 percent N; 38.9 percent B; and 4.2 percent Zn.

EXAMPLE 3

100 grams of product from Example 2 were renitrided with ammonia at 1,350° C. to give 80 grams of material analyzing 51 percent N; 42.5 percent B; and 0.13 percent Zn.

EXAMPLE 4

400 grams of boric acid were mixed with 240 grams of zinc borate and aggregate. 400 grams of the dried aggregates were nitride with ammonia at 900° C. to give 275 grams of material analyzing at 37.3 percent N; 35.1 percent B, and 9.8 percent Zn.

40 grams of this nitrided product were then mixed with 5.2 grams of lampblack, aggregated and dried at 300° C. 33 grams of these dried aggregates were then heated with nitrogen in a graphite tube at temperatures between 1,150° C. –1,800° C. to give 16 grams of clean white BN having less than 1 percent $B_2O_3$ soluble in dilute HCl and analyzing 55.5 percent N; 44.1 percent B; and <0.1 percent Zn.

EXAMPLE 5

On a larger scale 6,000 grams of boric acid was mixed with 3,600 grams of zinc borate, made into aggregates and nitrided with ammonia at 900° C. to give 4,166 grams of impure boron nitride containing zinc borate. 3,000 grams of this impure material was powdered and mixed with 324 grams of lampblack, aggregated and dried. The mixture was then heated with nitrogen at a temperature of 1,150°–1,800° C. to yeild 1,830 grams of boron nitride of 99 percent purity which contained no detectable zinc.

Various changes and modifications of the invention can be made and, to the extent that such variations incorporate the spirit of this invention, they are intended to be included within the scope of the appended claims.

We claim:
1. The process for preparing boron nitride which comprises reacting an oxidic compound of boron selected from boric acid and boric oxide with a nitriding agent at an elevated temperature sufficient to convert a major portion of said oxidic compound of boron to boron nitride, said oxidic compound of boron being dispersed on a support phase consisting of a chemically reducible zinc or cadmium compound, and then heating the resultant mixture to a temperature above 800° C. in a reducing atmosphere to convert said chemically reducible compound to the corresponding elemental metal, and continuing to heat the resultant mixture at a temperature of at least 900° C., thereby evaporating said elemental metal to give substantially pure boron nitride.

2. The process according to claim 1 in which said chemically reducible compound is cadmium borate.

3. The process according to claim 1 in which said chemically reducible compound is zinc borate.

4. The process according to claim 1 in which said nitriding agent is ammonia.

5. The process according to claim 1 in which said resultant mixture is heated to a temperature in the range of about 1,100° C. to about 1,800° C.

6. In the process for producing boron nitride by nitriding at an elevated temperature boric acid or boric oxide on a support phase, the improvement which comprises employing a chemically reducible zinc or cadmium compound as said support phase, and then heating the resultant reaction mass in a reducing atmosphere at a temperature above 800° C. to convert said zinc or cadmium to the elemental metal and evaporate said elemental metal from the reaction mass.

7. The process according to claim 6 in which said chemically reducible compound is a borate.

8. The process according to claim 6 in which said chemically reducible compound is zinc borate.

9. The process according to claim 6 in which said chemically reducible compound is cadmium borate.

10. The process according to claim 6 in which said resultant reaction mass is heated to a temperature in the range of about 1,100° C. to about 1,800° C.

11. The process for preparing boron nitride which comprises reacting ammonia with boric oxide or boric acid intimately mixed with zinc borate at an elevated temperature sufficient to convert the major portion of said boric oxide or boric acid to boron nitride and then heating the resultant reaction mass to a temperature of at least about 900° C. in a reducing atmosphere thereby converting the zinc borate to elemental zinc and evaporating the elemental zinc from the reaction mass to leave substantially pure boron nitride.

12. The process according to claim 11 in which the boric oxide or boric acid is mixed with zinc borate in a weight ratio of about 3:1 to 3:4.

13. The process according to claim 11 in which said resultant reaction mass is heated at a temperature of about 1,100° C. to 1,800° C.

14. The process according to claim 11 in which the resultant reaction mass is heated in the presence of carbon added after the initial reaction.

UNITED STATES PATENT OFFICE
CERTIFICATE OF CORRECTION

Patent No. 3,607,042  Dated September 21, 1971

Inventor(s) SCOTT GORDON ARBER et al.

It is certified that error appears in the above-identified patent and that said Letters Patent are hereby corrected as shown below:

In the Abstract, 4th line, the word "viscosity." should read --then--;

5th line, the words and numbers "glass C. to 3603" should read --1100° to--.

In Column 1, line 66, the number "5" should read --4--.

In Column 2, line 22, the period (.) before the word "made" should be a comma (,);

line 33, the number "1,200" should read --1100--;

line 38, the number "80" should read --81--;

line 44, the word "aggregate" should read --aggregated--;

line 45, the word "nitride" should read --nitrided--.

Signed and sealed this 30th day of May 1972.

(SEAL)
Attest:

EDWARD M. FLETCHER, JR.
Attesting Officer

ROBERT GOTTSCHALK
Commissioner of Patents